United States Patent Office 3,210,322
Patented Oct. 5, 1965

3,210,322
TREATMENT OF OXYMETHYLENE
POLYMERIZATION PRODUCT
George Wayne Polly, Jr., and Walter Ernst Heinz, both of Corpus Christi, Tex., assignors to Celanese Corporation of America, New York, N.Y., a corporation of Delaware
No Drawing. Filed Feb. 9, 1961, Ser. No. 88,009
10 Claims. (Cl. 260—45.95)

This invention relates to trioxane polymers and particularly to the treatment of the reaction product mixture of a trioxane polymerization process.

It is known that trioxane may be polymerized to produce a tough, thermally stable oxymethylene polymer, having successively recurring oxymethylene groups.

The polymerization preferably takes place in the presence of boron fluoride-containing trioxane polymerization catalysts, including boron trifluoride coordinate complexes with organic compounds in which oxygen or sulfur is the donor atom, as disclosed in U.S. Patent 2,989,506 of Hudgin and Berardinelli, boron trifluoride, as disclosed in U.S. Patent 2,989,507 of Hudgin and Berardinelli, boron trifluoride complexes with water, as disclosed in application Serial No. 67,918, continuation-in-part of application Serial No. 718,124, now abandoned, and boron trifluoride complexed with weakly basic nitrogen or phosphorus compounds as disclosed in U.S. Patent 2,989,511 of Schnizer. Suitable specific catalytic materials and proportions are disclosed in these applications which are incorporated herein by reference.

Upon the completion of the polymerization reaction the oxymethylene polymer has been recovered by quenching the reaction product in an aqueous or organic solvent for trioxane followed by repeated filtration and washing steps and a final drying step. Recovery in this manner involves considerable handling and recovery of unreacted monomer requires separation from a large amount of solvent. However, it has been considered necessary to use this method of recovery to avoid excessive degradation of the polymer.

It is an object of this invention to provide a method for recovering oxymethylene polymers from trioxane reaction products without excessive degradation. Other objects will appear hereinafter.

The objects of this invention are achieved by a method for treating a trioxane polymerization product comprising a high molecular weight oxymethylene polymer and unreacted trioxane which comprises maintaining said polymerization product in contact with a drying gas at an elevated temperature for a period sufficient to volatilize substantially all of said unreacted trioxane.

The drying gas may be air or may be an inert gas, such as nitrogen, carbon dioxide or methane. Under certain conditions an inert gas may be preferable in order to minimize polymer degradation but under other conditions, described below there is little or no degradation with the use of air as the drying gas.

In the polymerization process, a trioxane solvent, such as cyclohexane may be used. A complete description of the method of polymerizing trioxane in the presence of a trioxane solvent may be found in U.S. Patent 2,989,508 of Hudgin and Berardinelli. This invention finds its greatest advantage in connection with those polymerization processes wherein it is preferred to use no solvent since contamination of the polymer with solvent may be completely avoided in such cases. In any case, for the purpose of this invention, it is preferred to polymerize in the presence of no more than about 10 weight percent of solvent, based on the weight of trioxane, although reaction products containing as much as 50% solvent are free flowing powders and suitable for this invention.

For improved thermal stability it is preferred to polymerize the trioxane in the presence of a comonomer comprising a cyclic ether having adjacent carbon atoms. The copolymers produced from trioxane and such a comonomer have successively recurring oxymethylene groups and contain oxyalkylene groups having adjacent carbon atoms. Such copolymers may be described as having at least one chain containing at least 85 mol percent of oxymethylene (—$OCH_2$—) units interspersed with (—O—R—) units wherein R is a divalent radical containing at least two carbon atoms directly linked to each other and positioned in the chain between the two valences with any substituent in the R radical being inert. Copolymers containing oxyethylene groups may be prepared when ethylene oxide or 1,3-dioxolane is used as the comonomer and are preferred. A complete description of the method of copolymerizing trioxane with such cyclic ethers may be found in U.S. Patent 3,027,352 of Walling, Brown and Bartz, issuing upon application Serial No. 63,491, continuation-in-part of application Serial No. 718,148, now abandoned.

The comonomers are usually included in the reactant mixture in amounts between about 0.1 and about 20 weight percent, based on the weight of trioxane and the copolymers contain from about 0.1 to about 20 weight percent of oxyalkylene groups with adjacent carbon atoms.

In carrying out this invention it is preferable to contact the polymerization product with the drying gas in an elongated contact zone by passing the drying gas through the polymerization product. The temperature of the drying gas at its inlet to the contact zone is usually between about 115° and about 170° C. and preferably between about 135° and about 160° C.

The drying gas is usually passed through the contact zone at a rate of from about 15 to about 2000 contact zone volumes per hour and preferably from about 35 to about 300 contact zone volumes.

The polymerization product may be maintained in the contact zone as a batch or may pass through the contact zone continuously, preferably countercurrent to the drying gas. Its residence time in the contact zone is usually between about 5 minutes and about 8 hours and preferably from about 20 minutes to about 1 hour.

In accordance with one preferred embodiment of this invention where it is desired to reduce polymer degradation to a minimum, the polymerization product may be loosely blended, as by tumbling, with a thermal stabilizer for oxymethylene polymers prior to the drying operation. In accordance with this preferred embodiment, drying with air produces as little degradation as drying with an inert gas when the thermal stabilizer comprises a phenolic anti-oxidant.

The proportion of stabilizer incorporated depends upon the specific stabilizer used. A proportion between about 0.05 and 5 weight percent (based on the weight of polymer) has been found to be suitable for most stabilizers.

One suitable stabilizer system is a combination of an anti-oxidant ingredient such as a phenolic anti-oxidant and most suitably a substituted bisphenol, and an ingredient in inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(5-methyl-6-tertiary butyl phenol)

and 4,4'-butylidene bis(6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors includes carboxylic polyamides, polyurethanes, substituted polyacrylamides, polyvinyl pyrrollidone, hydrazines, compounds having 1 to 6 amides groups, proteins, compounds having tertiary amine and terminal amide groups, compounds having amidine groups, cycloaliphatic amine compounds and aliphatic acylureas. Suitable scission inhibitors as well as suitable antioxidants and proportions are disclosed in application Serial No. 826,115, filed by Dolce on July 10, 1959, application Serial No. 831,720, filed by Dolce, Berardinelli and Hudgin on August 5, 1959, application Serial No. 258,126, continuation-in-part of application Serial No. 838,427, now abandoned, filed by Berardinelli on September 8, 1959, application Serial No. 838,832, filed by Dolce and Hudgin on September 9, 1959, application Serial No. 262,348, continuation-in-part of application Serial No. 841,690, now abandoned, filed by Kray and Dolce on September 23, 1959, application Serial No. 256,146, continuation-in-part of application Serial No. 851,560, now abandoned, filed by Berardinelli, Kray and Dolce on November 9, 1959, application Serial No. 1,457, filed by Dolce and Berardinelli on January 11, 1960, and application Serial No. 4,881, filed by Kray and Dolce on January 27, 1960. The disclosures of the above-mentioned applications are incorporated herein by reference.

In accordance with another preferred embodiment of this invention, particularly applicable where the drying gas is an inert gas, a volatile catalyst neutralizing agent, such as ammonia or a volatile aliphatic, cycloaliphatic or heterocyclic amine may be carried in the drying gas. Tertiary amines are preferred since ammonia, and the primary and secondary amines are reactive with the trace amounts of liberated formaldehyde and may produce products which impart undesirable odor or color to the product. Suitable tertiary amines include tributylamine, tripropylamine, triethylamine, trimethylamine, pyridine, N,N' - dimethyl - cyclohexylamine, N,N' - diethyl-cyclohexylamine, N,N'-dipropyl cyclohexylamine, N-methylpiperidine, N-ethyl-piperidine and N-propyl-piperidine.

The amount of volatile catalyst neutralizing agent carried by the drying gas will vary with the amount of catalyst used in the polymerization, but will usually be in the range of 0.1 to 5 volume percent based on the volume of the drying gas.

In general, in accordance with this invention, it is preferred that the catalyst level in the polymerization step be maintained in the lower portion of the range disclosed in the polymerization patent applications, or between about 0.0002 and about 0.02 weight percent, based on the weight of trioxane.

The following examples, in which all "parts" are parts by weight unless otherwise indicated, illustrate the preferred modes of carrying out the invention and show that the polymer degradations obtained are no more than those obtained by prior art washing methods despite the advantage of easier handling.

Example I

Trioxane (5650 parts) and 1,3-dioxolane (99 parts) were charged to a Baker-Perkins sigma blade reactor. The monomers were heated to 60° C. while being worked by the sigma blades at 32 r.p.m. Boron trifluoride dibutyl etherate was added (5 p.p.m. based on its boron trifluoride content and the weight of the trioxane) and the mixture was worked for a period of 30 minutes, reaching a maximum temperature of 68° C. During the course of the reaction the appearance of the mixture changed from that of a doughy plastic mass to that of a powdery product. The polymerization product contained 46 weight percent of high molecular weight copolymer.

(a) A portion of the polymerization product was quenched and washed three times with 3 to 5 volumes of acetone per volume of moist powdered polymer then filtered and vacuum dried in accordance with the prior art method of aftertreatment.

(b) A second portion of the polymerization product was blended by tumbling with 1% each of powdered polyvinyl pyrrolidone (M.W. 30,000) and powdered 2,2'-methylene bis(4-methyl-6-tertiary butyl phenol). The blended product was charged to a column having a length about 32 times its diameter. Heated air was passed through the drying tower at a rate of about 1.2 tower volumes per minute for a total drying time of 120 minutes, including 71 minutes at the maximum temperature of 159–162° C. The inherent viscosity of the washed product of the prior art and of the dried product of this invention were identical at 1.75 (average of two determinations in each case, measured in 0.1 weight percent solution in p-chlorophenol containing 2 weight percent of alpha-pinene at 60° C.).

(c) A third portion of the polymerization product was treated as described in (b) except that the drying gas was nitrogen and the time of drying was 295 minutes, including 207 minutes at the maximum temperature of 138–144° C. The inherent viscosity of this product (measured as above) was also 1.75.

Example II

A copolymer of trioxane and 1,3-dioxolane was prepared as described in Example I except that the catalyst concentration was 10 p.p.m. and the maximum temperature was 86° C. The product contained 77.1 weight percent of high molecular weight copolymer.

(a) A portion of the copolymerization product was washed and dried as described in Example Ia.

(b) A second portion of the copolymerization product was charged to the drying tower described above and heated nitrogen, containing about 4 weight percent of tri-n-butylamine, was passed through at the rate of about 1.2 tower volumes per minute for 120 minutes, including 37 minutes at the maximum temperature of 150–156° C. The inherent viscosity of the washed product and of the nitrogen-dried product were identical at 1.15 (measured as described above).

Example III

Trioxane (5150 parts) and 1,3-dioxolane (282.5 parts) were charged to a Baker-Perkins sigma black reactor. Boron trifluoride etherate was added (65 p.p.m. based on its boron trifluoride content and the weight of the trioxane). The mixture was worked for 20 minutes at a temperature of 54–59° C. and for an additional 100 minutes at 54–55° C. The polymerization product contained 71.2 weight percent of high molecular weight copolymer.

(a) A portion of the copolymerization product was washed and dried as described in Example Ia.

(b) A second portion of the copolymerization product was blended by tumbling with 0.5 weight percent of powdered malonamide and 1.0 weight percent of powdered 2,2'-methylene bis(4-methyl-6-tertiary butyl phenol). The blended product charged to the drying tower described above and heated nitrogen was passed through at the rate of about 5 tower volumes per minute for 180 minutes, including 115 minutes at the maximum temperature of 145–150° C. The inherent viscosity of the washed product was 1.3 while that of the nitrogen-dried product was 1.1 (both measured as above).

It is to be understood that the foregoing detailed description is given merely by way of illustration and that many variations may be made therein without departing from the spirit of our invention.

Having described our invention what we desire to secure by Letters Patent is:

1. Method for treating a trioxane polymerization product comprising a high molecular weight oxymethylene polymer, a trioxane polymerization catalyst and unreacted trioxane which consists essentially of loosely blending said polymerization product in solid condition with a finely divided thermal stabilizer for oxymethylene polymers and thereafter maintaining said blend in contact with a drying gas at an elevated temperature of 115–170° C., for a period sufficient to volatilize substantially all of said unreacted trioxane, said period being in range of 5 minutes to 8 hours.

2. The method of claim 1, wherein said thermal stabilizer comprises a phenolic anti-oxidant.

3. The method of claim 1, wherein said thermal stabilizer comprises not more than 5 weight percent of a phenolic anti-oxidant and not more than 5 weight percent of a scission inhibitor, based on the weight of polymerization product.

4. The method of claim 8, wherein said catalyst neutralizing agent is selected from the group consisting of volatile aliphatic amines and volatile cycloaliphatic amines.

5. Process as set forth in claim 4 in which said catalyst is a boron trifluoride-containing catalyst and said gas is nitrogen.

6. Method for preparing a high molecular weight oxymethylene copolymer having a melting point of at least 150° C. and having at least one chain containing at least 85 mol percent of oxymethylene (—OCH$_2$—) units interspersed with (—O—R—) units wherein R is a divalent radical containing at least two carbon atoms directly linked to each other and positioned in said chain between the two valences, any substituents in said R radical being inert which comprises polymerizing trioxane in the presence of a boron trifluoride-containing polymerization catalyst until a polymerization product containing said oxymethylene polymer, said catalyst, and unreacted trioxane is obtained, and treating said polymerization product by a process which consists essentially of loosely blending said polymerization product in solid condition with a finely divided thermal stabilizer for oxymethylene polymers and thereafter maintaining said blend in contact with a drying gas at an elevated temperature of 115–170° C. for a period sufficient to volatilize substantially all of said unreacted trioxane, said period being in the range of 5 minutes to 8 hours.

7. Method for preparing a high molecular weight oxymethylene copolymer which comprises copolymerizing trioxane and a cyclic ether containing adjacent carbon atoms in the presence of a boron trifluoride-containing polymerization catalyst until a polymerization product containing said oxymethylene copolymer, said catalyst, and unreacted trioxane is obtained and maintaining said polymerization product in contact with a drying gas at a temperature of 115–170° C., said gas containing a volatile catalyst neutralizing agent, for a period sufficient to volatilize substantially all of said unreacted trioxane, said period being in the range of 5 minutes to 8 hours.

8. Method for treating a trioxane polymerization product comprising a high molecular weight oxymethylene polymer, a trioxane polymerization catalyst, and unreacted trioxane which comprises maintaining said polymerization product in contact with a drying gas at a temperature of 115–170° C., said gas containing a volatile catalyst neutralizing agent, for a period sufficient to volatilize substantially all of said unreacted trioxane, said period being in the range of 5 minutes to 8 hours.

9. Process as set forth in claim 8 in which said catalyst is a boron trifluoride-containing catalyst and said gas is selected from the group consisting of air and nitrogen.

10. Method for treating a trioxane polymerization product comprising a high molecular weight oxymethylene copolymer having a melting point of at least 150° C. and having at least one chain containing at least 85 mol percent of oxymethylene (—OCH$_2$—) units interspersed with (—O—R—) units wherein R is a divalent radical containing at least two carbon atoms directly linked to each other and positioned in said chain between the two valences, any substituents in said R radical being inert, a trioxane polymerization catalyst, a trioxane solvent, and unreacted trioxane which consists essentially of loosely blending said polymerization product in solid condition with a finely divided thermal stabilizer for oxymethylene polymers and thereafter maintaining said blend in contact with a drying gas at an elevated temperature of 115–170° C. for a period sufficient to volatilize substantially all of said unreacted trioxane, said period being in the range of 5 minutes to 8 hours.

References Cited by the Examiner

UNITED STATES PATENTS

| | | | |
|---|---|---|---|
| 2,568,018 | 9/51 | MacLean et al. | 260—67 |
| 2,795,571 | 6/57 | Schneider | 260—67 |
| 2,982,758 | 5/61 | Michaud | 260—67 |
| 2,989,509 | 6/61 | Hudgin et al. | 260—67 |
| 3,001,235 | 9/61 | Komiyama et al. | 260—67 |
| 3,103,499 | 9/63 | Dolce et al. | 260—67 |

FOREIGN PATENTS 1,216,327  11/59  France.

WILLIAM H. SHORT, *Primary Examiner.*

MILTON STERMAN, LOUISE P. QUAST, *Examiners.*